UNITED STATES PATENT OFFICE.

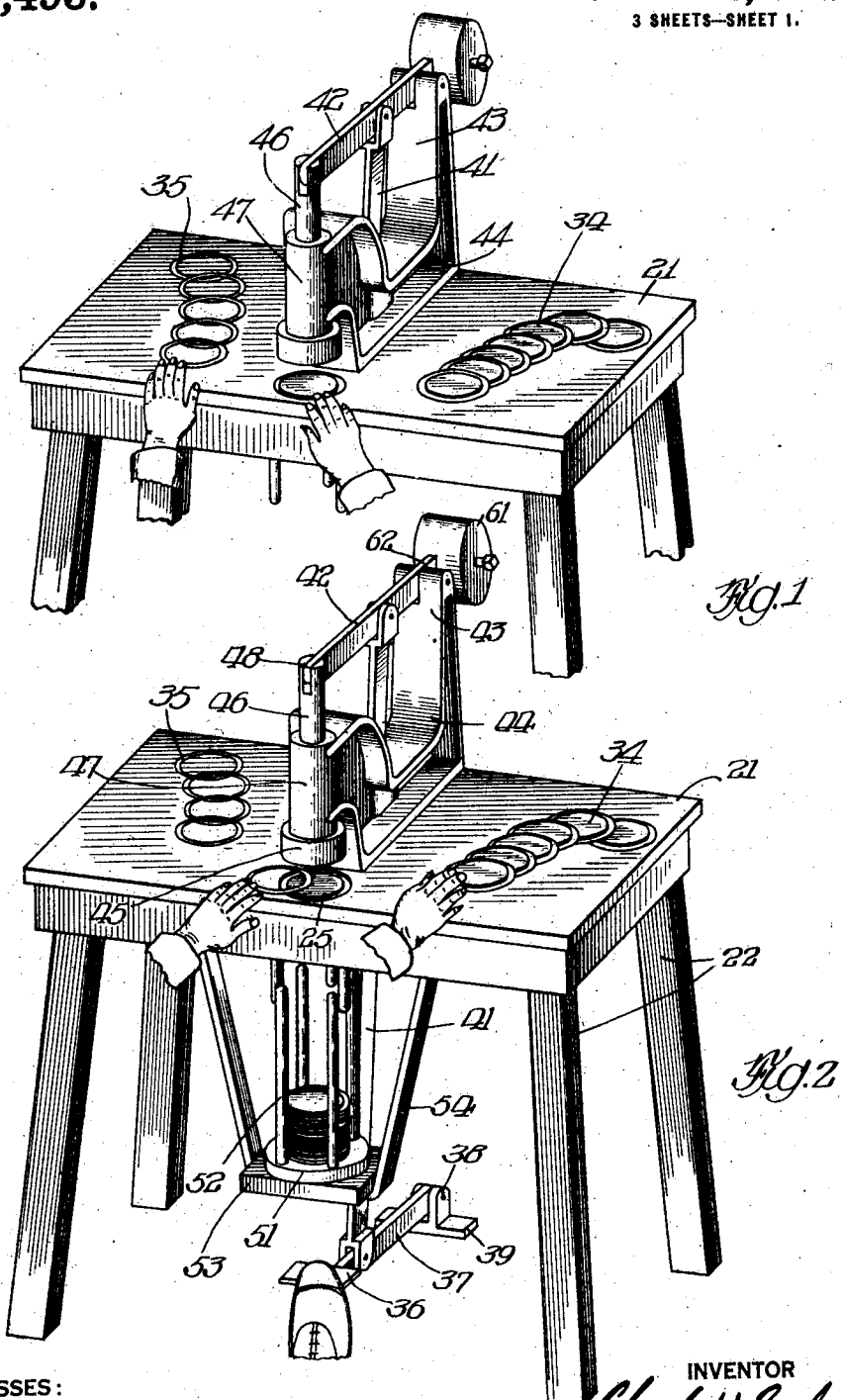

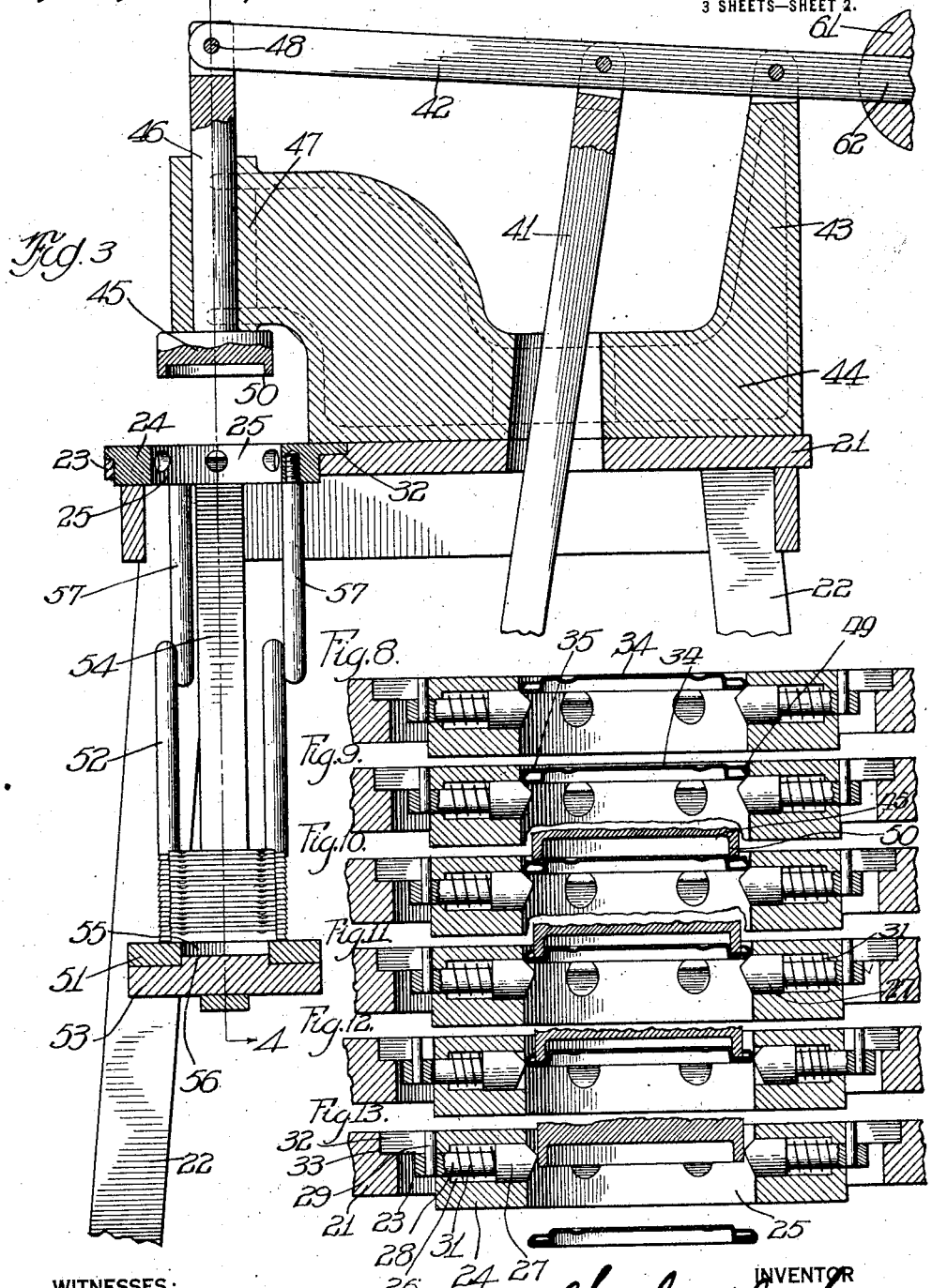

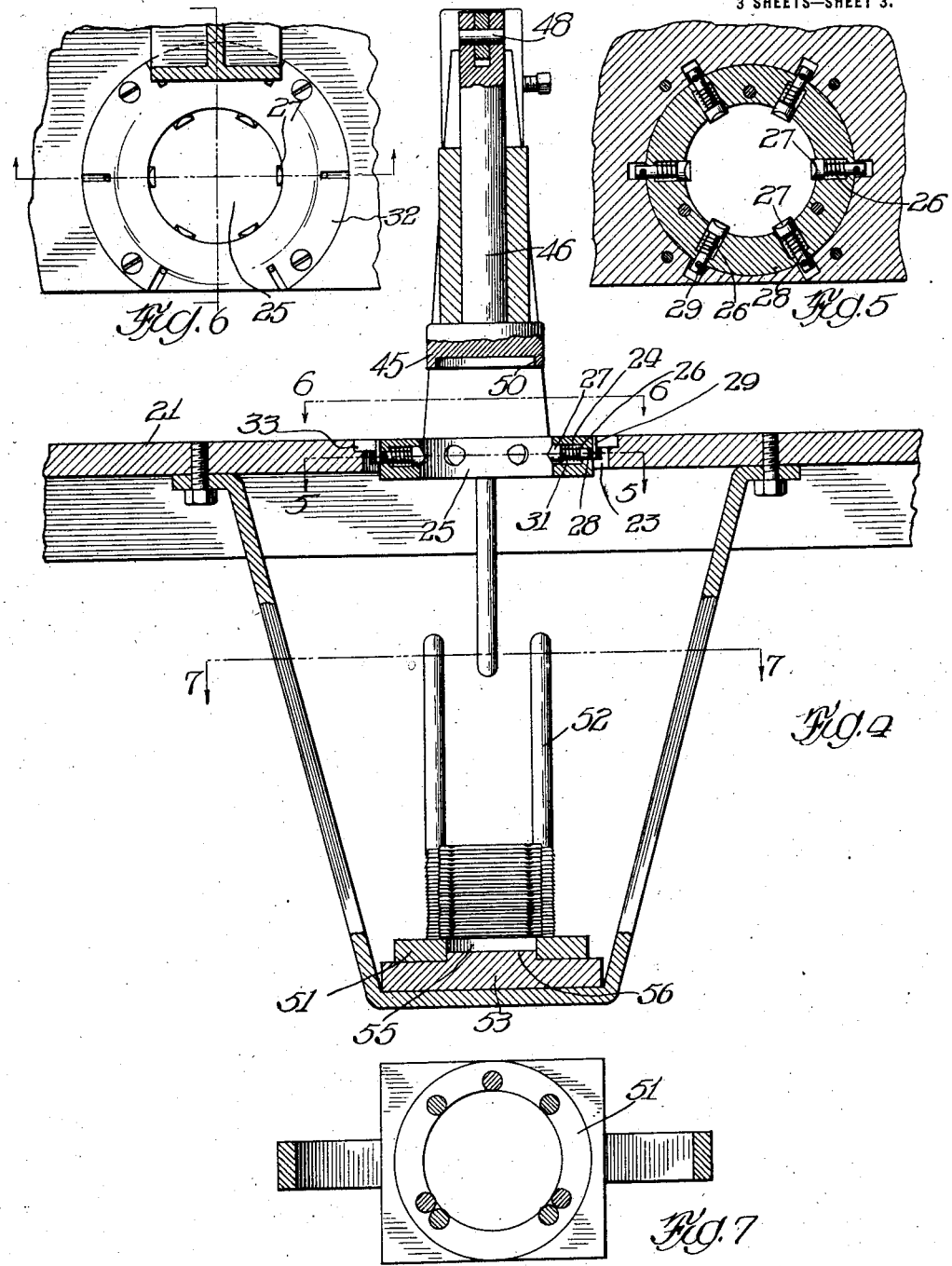

CHARLES W. GRAHAM, OF ALLENDALE, NEW JERSEY, ASSIGNOR TO AMERICAN CAN COMPANY, OF NEW YORK, N. Y., A CORPORATION OF NEW JERSEY.

SEMI-AUTOMATIC GASKET-LINING MACHINE.

1,392,493.  Specification of Letters Patent.  Patented Oct. 4, 1921.

Application filed October 13, 1917. Serial No. 196,506.

*To all whom it may concern:*

Be it known that I, CHARLES W. GRAHAM, a citizen of the United States, residing in Allendale, in the county of Bergen and State of New Jersey, have invented a new and useful Improvement in Semi-Automatic Gasket-Lining Machines, of which the following is a specification.

This invention relates in general to machines for assembling thin, flat paper or similar gaskets with can ends to produce can ends having paper lined flanges adapted to be interfolded with the flanges of the can bodies to form hermetic closures for said bodies.

A principal object of the present invention is the provision of a machine of this character adapted for use in small establishments requiring only a few hundred or a thousand lined ends per day, although many features of the invention may be embodied with advantage in machines having greater capacity.

My invention contemplates the construction of an extremely small semi-automatic machine for assembling gasket liners and can ends, readily operable without the use of other power than that that may be supplied by the operator himself and consisting of few parts so constructed and arranged as to be permanently efficient and unlikely to require frequent and extensive repair or replacement.

A still further object of the invention is the provision of a machine of this character, the operation of which will be obvious or so readily apparent as to enable unskilled attendants to effectively operate the same after a few simple instructions.

Other objects and advantages of the invention will be apparent as it is better undestood from the following description when considered in connection with the accompanying drawing illustrating a preferred embodiment thereof.

On the drawings,

Figures 1 and 2 are perspective views of a machine or apparatus embodying my present invention and illustrating the action of the attendant in placing the can ends and the gaskets in position for assembling;

Fig. 3 is a transverse, enlarged, central, vertical section through the apparatus;

Fig. 4 is a similar partial section taken at right angles to the plane of the section in Fig. 3;

Fig. 5 is a section taken substantially on the line 5—5 of Fig. 4;

Fig. 6 is a section taken substantially on the line 6—6 of Fig. 4;

Fig. 7 is a section taken substantially on the line 7—7 of Fig. 4;

Figs. 8 to 13 are enlarged partial sections showing successive steps in the operation of assembling the liners and can ends and ejecting the assembled structure.

For the purpose of illustrating my invention I have shown on the drawing a bed 21 of ordinary table form and mounted upon four legs 22, this table or bed being of any preferred shape and construction and having an opening 23 located at the front and extending therethrough. In this opening is mounted a member 24 having a central aperture or perforation 25 in which the can end and gasket is placed for assembling. The member 24 is of cylindrical form and is provided with a plurality of radially extending perforations 26 larger at the ends adjacent the aperture 25 than at the outside. In the enlarged portions of each of these perforations is seated a plunger 27 carried by a stem 28 extending through the smaller portion of the radial perforations and beyond the outside outer edge of the member 24. The portion of the stem 28 extending beyond the perforation is provided with a pin 29, and a spring 31 is positioned between the plunger 27 and the base of the enlarged part of the perforation. The forward face of each plunger is of wedge shape and extends into the assembling aperture 25. The construction just described is duplicated so that a number of these plungers normally protrude into the aperture and form an assembling seat for the can end when the same is placed in the aperture as will be later more fully described. At the top the member 24 is provided with a flange 32 resting in a countersink 33 to support the member 24 in its aperture.

It is intended in the present instance that the can ends and gaskets be manually positioned for assembling and to this end a pile of can ends 34 is placed upon the bed or table at one side and a pile of gaskets 35 at the other. The operator stands directly in front of the bed and reaches with one hand for a can end sliding it over the bed and into the aperture. The plungers are preferably so arranged that the top of the inverted can end is disposed at or just beneath the plane of the upper surface of the bed. The other hand of the operator then selects a gasket and slides it over and around the central part of the can end. The assembling operation is accomplished manually by the operator pressing with his foot upon a pedal 36 of a lever 37 pivoted and fulcrumed at 38 in a bracket 39 fast on the floor or upon other suitable support.

The lever 37 is connected by a link 41 with a plunger operating lever 42 pivoted and fulcrumed in an upright portion 43 of a plunger carrying frame 44. A plunger 45 mounted directly above and in alinement with the aperture or perforation 25 has an upwardly extending stem or rod 46 guided in a bearing 47 of the frame 44 and connected at 48 with the forward end of the lever 42. When the foot is depressed the plunger moves downwardly, first assembling the gasket on the shoulder and beneath the flange of the can end and then pushing the can end with the gasket past the retractable supports, i. e. the spring pressed plungers 27, and through the bed so that it may drop to a receiving station. The cycle of operation is illustrated in successive steps in Figs. 8 to 13.

Viewing Fig. 8 it will be noted that the can end is positioned and ready to receive the gasket. In Fig. 9 the gasket has been slid over the bed and deposited upon the can end with its edges resting upon the inturned edge 49 of the flange. The plunger is then caused to descend and is shown in Fig. 10 as it engages the gasket in the initial portion of the assembling step. The plunger 45 has a depending flange 50 adapted to pass within the inturned flange 49 of the can end, bending back the edge of the gasket and causing it to snap by and into the assembled position shown in Fig. 11. The plunger continues down in its movement after assembling the can end, causing a retraction of the plungers or supports 27 against the action of the springs 31, as may be seen in Fig. 12, pushing the can end finally past these supports and permitting it to drop, as indicated in Fig. 13.

Arrangements are provided in the present instance to receive the lined ends and arrange them in stacked formation. A stack holder, consisting of a base 51 from which four rods 52 extend upwardly in position to receive the ends as they fall, is mounted upon a support 53 held by arms 54 depending from the underside of the bed. In order that this stack holder may be accurately located to register with the perforation 25 the base 51 is perforated at 55 to receive a boss 56 extending up from the support 53. Fixed rods or pins 57 extend down from the underside of the bed and in circumferential alinement with the rods 52 already mentioned, said rods 57 and 52 being located about a circumference having a center in vertical alinement with the center of the perforation 25. The stack holder may be removed when it has received a sufficient number of can ends and emptied or replaced by another. In order to facilitate the operation of the plunger a counterbalancing weight 61 is mounted upon the end 62 of the lever 42 located at the back of the machine.

Attention is called to the arrangement of the hands in Figs. 1 and 2, from which it will be noted that the apparatus may be operated by moving the hands first to the one side and then to the other. In Fig. 1 a can end has just been positioned by the right hand and the left is reaching for the gasket. In Fig. 2 both hands have been shifted to the right and the left hand has positioned the gasket while the right reaches for a can end. From the position shown in Fig. 2 the hands are moved back again to the position shown in Fig. 1 and during this last movement the pedal 36 is pressed by the foot to assemble and push the lined can end from the machine.

It is not necessary for all the purposes of this invention that the can end be delivered through the bed and it will be manifest that various changes may be made in the form, construction and arrangement of the parts without departing from the spirit and scope of the invention or sacrificing all of its material advantages, the form hereinbefore described being merely a preferred embodiment thereof.

I claim:

1. A machine for assembling thin, annular gaskets with flanged and shouldered can ends, comprising in combination a bed having an aperture therein into which from the same side of said bed a can end smaller than the aperture and a superposed gasket may be manually positioned, together with means moving into said aperture for assembling the gasket upon the flange of said can end, and yielding supporting means in said aperture for sustaining the can ends against the assembling pressure and removable by additional pressure to permit the passage of the assembled can ends and gaskets.

2. A machine for assembling thin, annular gaskets with flanged and shouldered can ends, comprising in combination a bed having a perforation therein into which from the same side of said bed a can end smaller than the perforation and a superposed gasket may be positioned one on the other, said perforation being adapted to permit of the passage of can ends entirely through the same from the top to the bottom and having means for temporarily supporting can ends near the top surface of the bed, and means movable into said perforation for forcing the gasket on to the can end to assemble the same.

3. A machine for assembling thin, annular gaskets with flanged and shouldered can ends, comprising in combination a bed having a perforation extending through it in an axial direction and adapted to permit the passage of can ends in said direction into the top and out from the bottom of said perforation and into the top of which a can end smaller than the perforation and a superposed gasket may be placed, means temporarily supporting the can end and gasket in said perforation, and means movable into said perforation for assembling the gasket to the can end while the same is held in said perforation.

4. A machine for assembling thin, annular gaskets with flanged and shouldered can ends, comprising in combination a bed having an aperture into which from the same side of said bed a can end smaller than the aperture and a superposed gasket may be disposed in alinement, outwardly yielding means for supporting can ends in said perforation, and means movable into said aperture for assembling said gasket on to said can end and removing the can end with the liner from said aperture.

5. A machine for assembling thin, annular gaskets with flanged and shouldered can ends, comprising in combination a bed having a perforation extending through it in which a gasket and can end may be placed in alinement, yielding means holding the can end and gasket in said perforation, and a plunger movable into said perforation for assembling said gasket upon said can end and forcing the can end with the gasket past said yielding means and through said perforation.

6. A machine for assembling thin, annular gaskets with flanged and shouldered can ends, comprising in combination a bed having a can end and gasket receiving seat, a retractable support beneath the can end, means operating oppositely to said support for assembling said gasket upon the can end, said retractable support being moved from beneath the can end immediately upon the assembling of the gasket and can end to permit the end with the gasket to pass from the bed.

7. A machine for assembling thin, annular gaskets with flanged and shouldered can ends, comprising in combination a bed having an aperture adapted for the passage of can ends into the top and out from the bottom of the same into which from the same side of said bed a can end smaller than the aperture and a superposed gasket may be manually placed, means for supporting can ends in said aperture near the top surface of said bed and a manually operated plunger for assembling said gasket and can end.

8. A machine for assembling thin, annular gaskets with flanged and shouldered can ends, comprising in combination a bed having an aperture extending through the same in an axial direction into which from the same side of the bed a can end and a superposed gasket may be placed, and having extended supports at the right and left sides of the aperture on which gaskets and can ends may be spread out for manual feeding to the aperture in opposite directions, and a foot operated plunger for assembling said gasket and can end.

9. A machine for assembling thin, annular gaskets with flanged and shouldered can ends, comprising in combination a bed having a perforation extending therethrough and in which a can end and a gasket may be placed for assembling, a plurality of spring held stops extending into said perforation, and a plunger for assembling the gasket on the can end and through subsequently exerted downward pressure spreading said stops to force the can end with its gasket through said bed.

10. In a machine for assembling ring liners with can ends, the combination of a support having an aperture adapted to receive a can end and a superposed ring liner, and within said aperture yielding means for sustaining a can end while the ring liner is inserted therein by pressure, said yielding means being adapted to be moved away from the path of the can end to permit the passage of the lined can end entirely through the aperture.

11. In a machine for assembling ring liners with can ends, the combination of movable supporting means arranged in the path of a can end, means for guiding the can end and ring liner into supported position against said supporting means, and means for applying pressure to assemble the ring liner and can end and for causing said movable supporting means to move out of the path of the lined can end.

Signed in the presence of two subscribing witnesses.

CHARLES W. GRAHAM.

Witnesses:
 D. F. MENNIS,
 W. L. BALD.